United States Patent [19]

Stewart, Sr.

[11] 4,455,511

[45] Jun. 19, 1984

[54] WINDSHIELD WIPER MECHANISM

[75] Inventor: Kenneth W. Stewart, Sr., Columbus, Miss.

[73] Assignee: AMBAC Industries, Incorporated, Columbus, Miss.

[21] Appl. No.: 472,168

[22] Filed: Mar. 4, 1983

[51] Int. Cl.³ .................... H02K 7/06; H02P 1/02
[52] U.S. Cl. .................... 318/9; 318/DIG. 1; 318/DIG. 2; 318/282; 318/308; 318/443; 318/466
[58] Field of Search ............... 318/9, 281, 282, 283, 318/284, 285, 286, 443, 266, 466, DIG. 1, DIG. 2; 15/250.12, 250.13, 250.27, 250.30; 310/83, 112

[56] References Cited

U.S. PATENT DOCUMENTS

| 2,832,225 | 4/1958 | Hart | 318/466 X |
| 2,841,994 | 7/1958 | Dyer et al. | 318/466 X |
| 2,919,587 | 1/1960 | Sundt | 318/DIG. 2 |
| 2,919,598 | 1/1960 | Sundt | 318/DIG. 2 |
| 2,959,968 | 11/1960 | Gute et al. | 318/466 X |
| 3,253,206 | 5/1966 | Romanowski | 318/DIG. 2 |
| 3,262,038 | 7/1966 | Smith | 318/DIG. 2 |
| 3,282,120 | 11/1966 | Compton | 74/75 |
| 3,415,132 | 10/1968 | Druseikis | 74/42 |
| 3,649,898 | 3/1972 | Inoue | 318/443 X |
| 3,733,913 | 5/1973 | Schneider et al. | 74/78 |
| 4,259,624 | 3/1981 | Seibicke | 318/282 |
| 4,271,381 | 6/1981 | Munz et al. | 318/282 |
| 4,320,329 | 3/1982 | Gille et al. | 318/308 X |

FOREIGN PATENT DOCUMENTS 2048717 10/1975 Fed. Rep. of Germany.

Primary Examiner—G. Z. Rubinson
Assistant Examiner—Paul Shik Luen
Attorney, Agent, or Firm—John C. Dorfman

[57] ABSTRACT

A windshield wiper mechanism includes a motor driven gear and a drive plate positioned relative thereto but selectively rotatable to enable easy change of the effective wiper parts position. A park switch to automatically stops the arm and blade at a selected position on the windshield is located on the drive gear (driving rotatable member). Removal, rotation and reengagement of the drive plate relative to the motor driven gear then easily changes the wiper park position. The drive plate is provided with at least one opening located at a radial distance from the center rotating axis of the drive plate for receiving a pin of a connecting link that will provide oscillating motion to a shaft upon which a windshield wiper arm and blade is secured.

9 Claims, 6 Drawing Figures

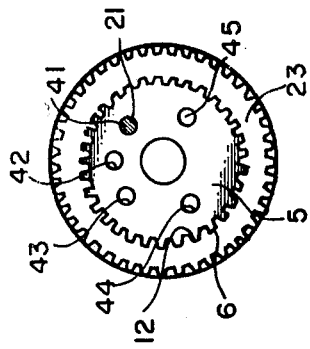
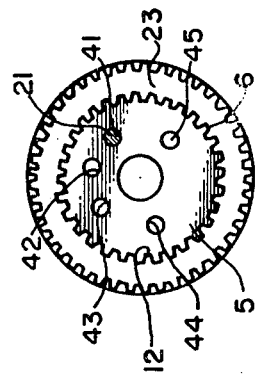
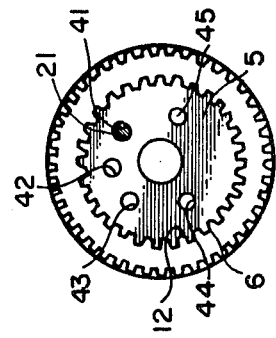
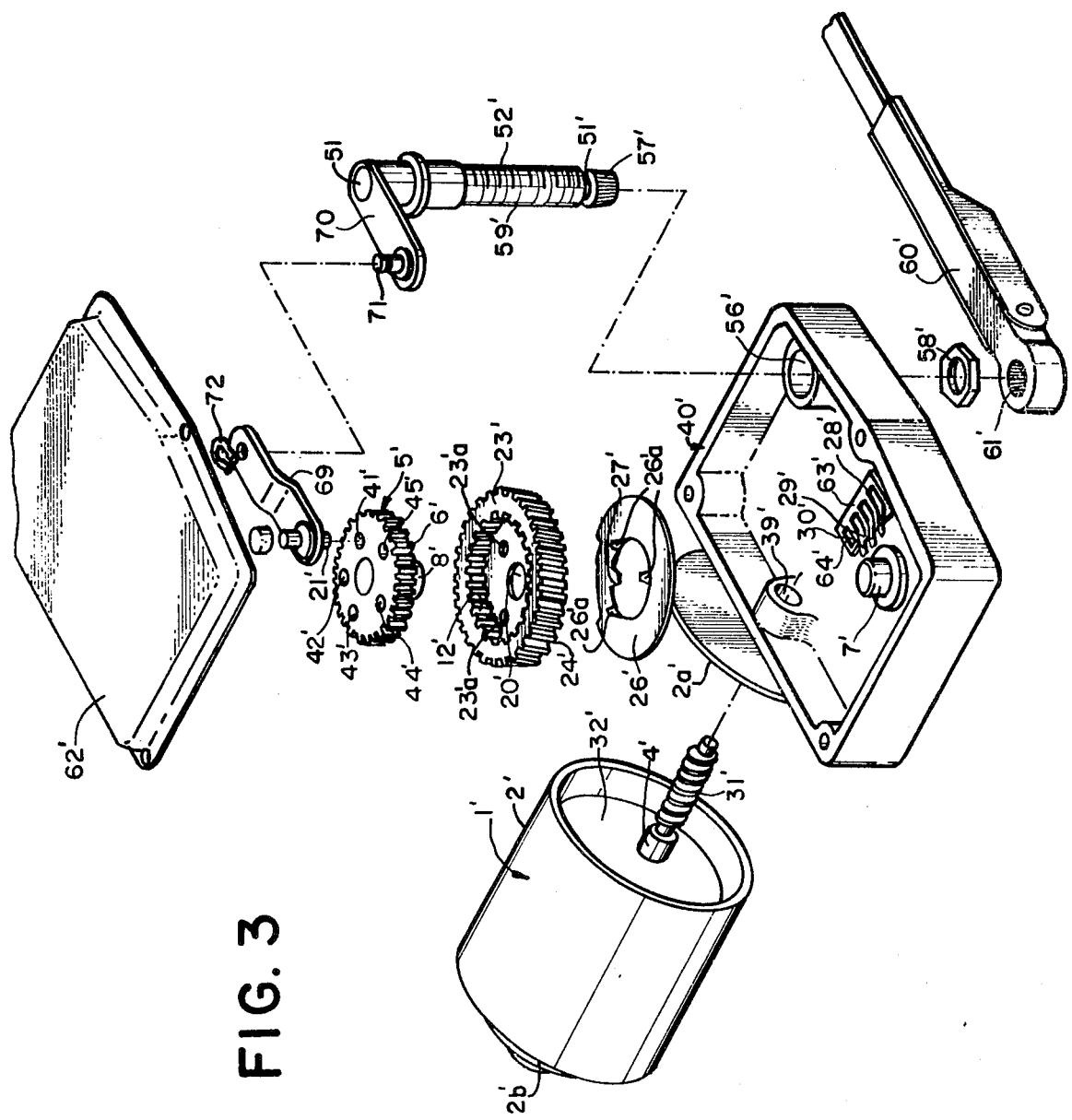

WINDSHIELD WIPER MECHANISM

BACKGROUND OF THE INVENTION

1. Field of the Invention

This invention relates in general to the construction of a windshield wiper for which the wipe angle may be varied, and the automatic park positions of the arm and blade may be selected and adjusted to provide very precise parking without the need for interchanging or replacing parts and, thereby, providing a means for producing one basic wiper construction for varied applications at a feasible cost.

2. Description of Prior Art:

Various types of windshield wipers are known where the rotating armature of an electric motor is converted to an oscillating motion that is provided to swing the arm and blade across a predetermined sector of a windshield. The conversion of rotary to oscillating motion is usually accomplished by various crank arms, gears and linkages. It is further well known to incorporate a park switch to automatically provide for parking the arm and blade at or near an end of travel of the wiper arm and blade as it travels across the windshield. The difficulty arising in the system of prior art involves the necessity to customize the wiper unit to meet the needs of each individual type of vehicle by producing special parts to provide the specific requirements for a given type vehicle. The varying requirements from application to application include variations in parking positions; for example, right or left side and the specified number of degrees from the end of travel. The number of degrees through which the arm and blade are required to travel during operation is another requirement. These special parts for each application may be low in volume and, therefore, higher in cost as compared to the remaining common parts that are produced in a much larger volume. Further, the presence of these special parts cause problems in stocking, inventory and associated paperwork.

SUMMARY OF THE INVENTION

In accordance with the present invention, there is provided a windshield wiper mechanism having a simplified means by which any one of a number of wipe angles can be selected by the placement of a given part with respect to a given location on another part. There is also a provision for automatically stopping or parking the arm and blade within a very precise and repeatable position at any preselected location within any of the preselected wipe angles through which the wiper arm and blade travels. These selections of wipe angles and park positions may be obtained by the proper positioning of parts comprising a portion of the wiper system without the need for component replacement.

More specifically the present invention involves a windshield wiper mechanism employing an electric motor having a housing supporting a field and rotatably supporting an armature with a shaft and a drive frame, such as a gear housing, supported on the motor housing. A driving rotatable member rotatably supported on the drive frame is coupled to and rotated by the motor shaft and is provided with teeth at a common radius. Parking switch means is provided on the rotatable member. A rotatably supported drive plate has interfitting teeth that mesh with the teeth of the driving rotatable member such that the drive plate is readily removable and repositionable in a plurality of positions relative to the driving rotatable member so as to change the relative positioning of the two. The drive plate has at least one hole located at a predetermined radial distance from the central axis about which the drive plate rotates as the motor shaft rotates. A drive link engages a pin positionable in the at least one hole, such that rotational movement can occur between the link and the drive plate. A shaft parallel to the axis of drive plate rotation is rotatably supported on the drive frame for driving a wiper arm and blade. The shaft is fixed at one end of the lever means, the other of which is coupled to said other end of the drive link so that reciprocating motion imparted to the end of the drive link causes the shaft to oscillate, thereby moving the wiper arm and blade back and forth through a predetermined angle in the course of a revolution of the drive plate. Therefore, by disengagement of the drive plate from the driving rotatable member and reengagement in a new rotationally reoriented position and reassembly with the same connections, the position in the wiper movement at which parking occurs may be changed without changing amplitude of wipe pattern of the blades.

BRIEF DESCRIPTION OF THE DRAWINGS

FIG. 3 is an exploded perspective view similar to FIG. 1 of the major parts of a modified windshield wiper; and FIGS. 4a, 4b and 4c are similar plan views of parts of the structure of FIG. 1 showing slightly modified relative positions resulting in changes of the park position for the windshield wiper.

DESCRIPTION OF A PREFERRED EMBODIMENT

Figure 1:
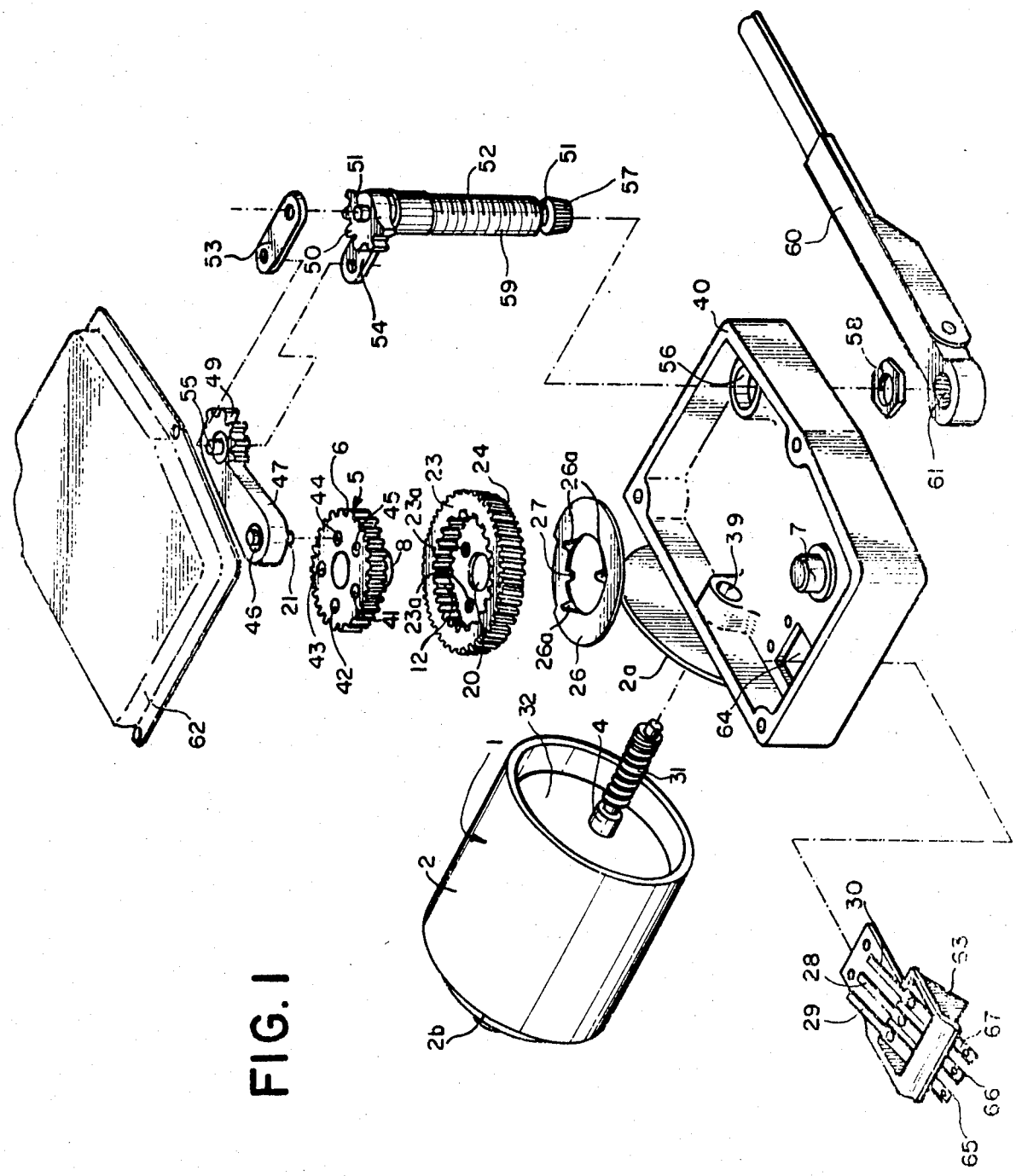
FIG. 1 is an exploded perspective view of the major parts of a preferred embodiment windshield wiper employing features of the present invention.

In FIG. 1, mechanical parts of a preferred embodiment of windshield wiper mechanism in accordance with the invention are shown in exploded view. A motor 1 having a housing 2 supporting a suitable field (not shown) contain and rotatably supports an armature having a shaft 4 engaged in bearings in end caps 2a and 2b. The end cap 2a may be fixed to a gear housing 40 which together with the motor housing 2 provides a system frame. When assembled gear and worm thread 31 on the extended end of the armature shaft 4 extends into the gear box where it meshes with teeth 24 on the outer periphery of the moulded insulating gear 23 serving as a driving rotatable member. A drive plate 5 is journaled so as to be rotatably supported on shaft 7, supported, in turn, on gear housing 40 by means of an extended bearing sleeve 8 that fits over the shaft. The sleeve extends through a concentric hole 20 of gear 23. As drive plate 5 is positioned within gear 23 teeth 6 on the drive plate mesh snugly with inwardly extending teeth 12 of gear 23. Therefore, when the drive plate is assembled into the gear and placed on shaft 7, the drive plate and the gear 23 are mechanically integral and together rotate as one piece about the shaft 7. Teeth 24 on the outer diameter of gear 23 are designed and positioned so as to mesh with the worm thread 31 on motor shaft 4 which extends through opening 39 of gear housing 40, a preferred form of drive frame. The worm 31, as it rotates, drives the gear 23 and the drive plate 5. The drive plate has a plurality of holes of uniform size 41, 42, 43, 44 and 45 having their axes parallel to the axis of rotation, each located at a different radius from the center axis of the drive plate. A pivot pin 21 extending through one end of drive link 47 is of a size to be snugly engaged and is positioned in a selected hole 41, 42, 43, 44 or 45 at various radii of the drive plate 5. A first section gear 49 on the other end of drive link 47 is properly oriented toward and meshes with a second sector gear 50. The second sector gear is fixedly secured to a pivot shaft 51 at the gear sector center that is rotatable in a sleeve 52. The two gear sectors are held together in a meshing relationship with each other by two similar links 53 and 54 which straddle the two gears and are free to pivot at one end about shaft 51 and at the other end about a parallel stub shaft 55 extending through and fixed to drive link 47 concentric with the sector gear 49. The pivot shaft sleeve 52 is press fitted into an opening 56 of gear housing 40. Pivot shaft 51 has a knurled driver 57 that is secured to shaft 51 and rotates therewith. A nut 58 screws on the threaded portion 59 of sleeve 52 and may be used for mounting the wiper assembly on the vehicle. A wiper arm 60 is secured to the knurl driver 57 by engagement with matching interfitting internal knurls 61 on the wiper arm. A windshield wiper blade, not shown, may be secured to the wiper arm by one of several existing and conventional means. A gear box cover 62 is provided for covering the gear housing 40 and is secured thereto by screws or other fastening means.

An automatic parking switch is comprised of an electrical conductive ring contact 26 that is secured to and rotates with the insulating material of gear 23 and three spring brushes or contacts 28, 29 and 30 which are positioned in a contact support member 63 preferably composed of molded resinous insulating material. The contact support member is secured to the gear housing 40, and the spring contacts extend into the gear housing at opening 64 in position to be resiliently urged into contact with either the ring contact 26 or the insulation of the gear 23 at all times. Terminal means 65, 66 and 67 for the contacts 29, 28 and 30, respectively, extend outside the housing 40 to which external electrical leads, as shown schematically in FIG. 2, may be connected.

Figure 2:
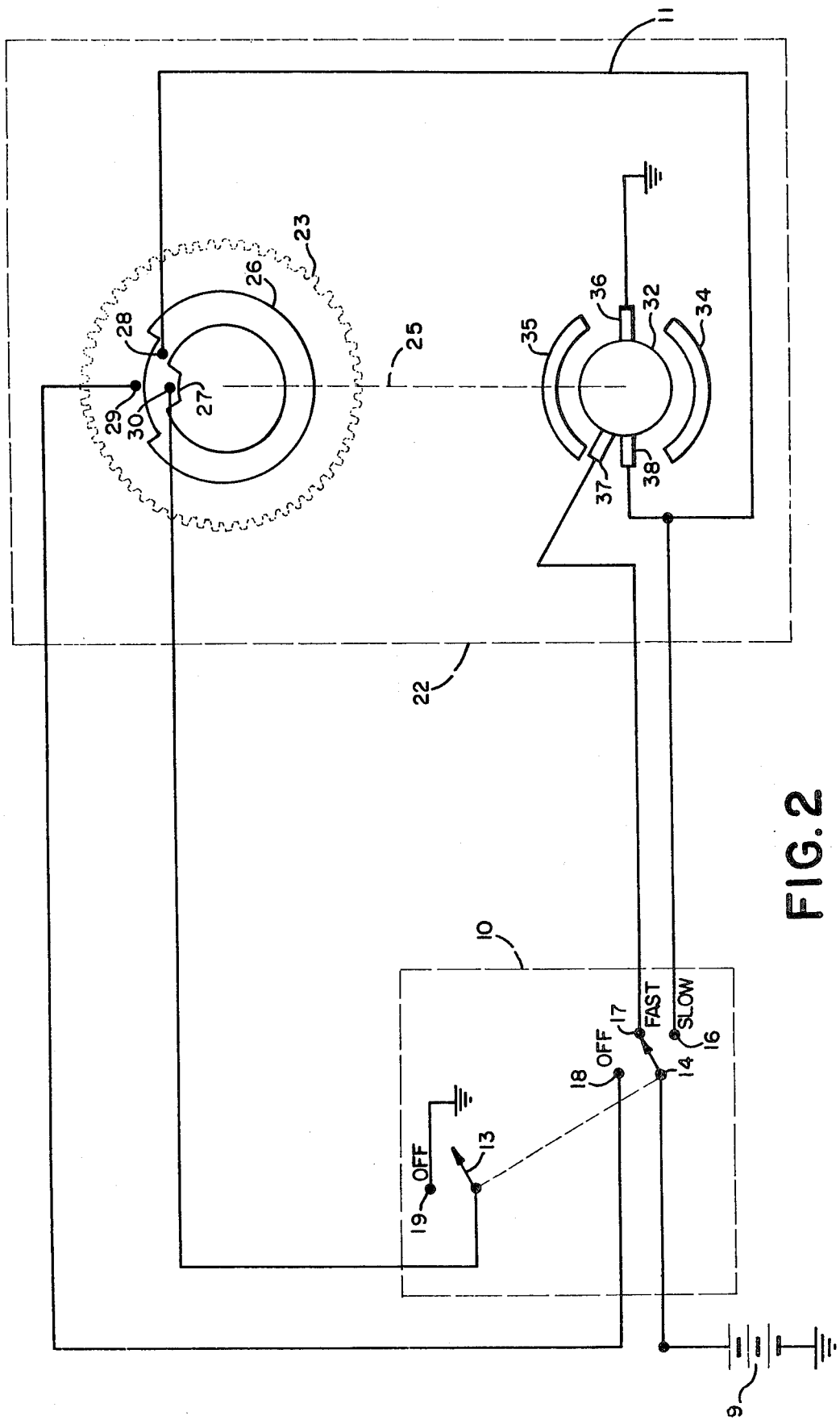
FIG. 2 is a schematic diagram of a wiper circuit for use with the mechanism of FIG. 1.

Referring now to FIG. 2, there is depicted schematically a circuit for a windshield wiper in which the components associated with the electrical circuit are shown. The manual control switch 10 consists of movable contacts 13 and 14 and fixed contacts 16, 17, 18 and 19. As shown schematically by a dashed connecting line, the movable contacts 13 and 14 are connected so as to move together. Switch 10 has three positions: off, fast and slow. The wiper motor assembly 22 has a driving rotatable gear 23 driven by the motor armature 32. Gear 23 is made of an electrical insulating material and conductive parking switch contact ring 26 which is generally planar in form, is secured to the gear 23 by inserting upturned tongs 26a of the ring into holes 23a in the gear, rotates therewith and serves as a common connector. Spring contacts 28, 29 and 30 are supported on a common, mutually insulating frame 63 on the gear box 40 so positioned at different radii from the axis of rotation in order to respectively contact the ring at selected intervals during each complete revolution of the gear. As illustrated in FIG. 1, contact 28 engages the ring at all times. Contact 29 engages the ring during approximately three-fourths of each revolution. Contact 30 engages on the ring for only a few degrees of each revolution and which occurs only when contact 29 is off the ring contact.

The connection between the armature 32 and gear 23 is shown schematically by dashed line 25. Other components of the motor shown include permanent magnet field pieces 34 and 35 and brushes 36, 37 and 38. The source of electrical power 9 has one terminal grounded and the other terminal connected to movable switch contact 14.

As shown, the manual control switch is in "fast" position; and a circuit, therefore, exists from the battery through contact 17 to brush 37 through armature 32 and to ground through brush 36. With contact 14 in "slow" position, a circuit exists from the battery through contact 16 to brush 38 through the armature to ground through brush 36. Brush 37 is angularly off center from brush 36 whereas brush 38 is diametrically opposite brush 36. The angular difference between brush 37 and 38 with respect to brush 36 results in a different commutation and, therefore, different speed of rotation of the armature. With movable contact 14 in "off" position against contact 18, movable contact 13 will also be resting on fixed contact 19 which is connected to ground. When the manual control switch 10 is placed in the "off" position and gear 23 is in position to have contact spring 29 resting on ring contact 26 a circuit exists from the power source through contact 29 to ring contact 26 and across to spring contact 28 and to brush 38. The armature will therefore continue to rotate and move gear 23 until such time as ring contact 26 moves from under contact 29 and contact 29 rests on the insulating surface of gear 23. When this occurs, all circuits from the power source to the armature 32 will be open. Due to inertia, the armature will continue to rotate for a few RPMs causing the gear to move the inwardly extending tab 27 of the ring contact under fixed spring contact 30, in the position shown in the schematic. In the position as shown, a circuit exists across the armature thus providing dynamic braking of the armature. Dynamic braking to prevent armature coasting is well known in the art of motor circuitry. As shown schematically in FIG. 2, the dynamic braking circuit comprises brush 38, conductor lead 11, contact 28, contact ring 26, contact 30, movable contact 13, contact 19 which is grounded and brush 36 which is also grounded to a common ground with that of contact 19. When the manual control switch is positioned in either a fast or slow position, a circuit is again provided to the armature that renders the wiper operative. Ring contact 26 and its respective spring contacts 28, 29 and 30 in conjunction with the circuits of FIG. 2 thus constitutes an automatic park switch.

At the time the wiper mechanism is assembled, the desired amplitude of wipe angle may first be selected by the placement of the end 21 of pin 46 in one of the plurality of parallel holes 41, 42, 43, 44 or 45 of identical diameter in drive plate 5 as seen in plan view FIG. 4a showing drive plate in one position in gear 23. The desired translation to oscillatory movement will be imparted to drive link 47. The larger the radius of the hole from the axis of rotation of the drive plate, however, the larger the translatory movement of link 47. The larger the translatory movement of link 47, the larger, in turn, will be the desired oscillatory angular movement of the wiper arm and blade across the windshield no matter which hole is selected. The position on the windshield at which the automatic park switch will stop the wiper arm and blade then may be precisely set by first engaging the wiper through contact 29 that causes the worm gear carrying the plate 26 to rotate until such time as contact 29 has moved off ring 26 and contact 30 has moved on to the inwardly extending tab 27 providing sudden stoppage of the motor armature by dynamic braking as previously discussed. This establishes the position of the worm gear with respect to the park switch in the parked mode. With this position established, the positioning of the arm and blade when parked is accomplished by lifting drive plate 5 out of the recessed area of gear 23 a sufficient amount so as to disengage the teeth 6 of the drive plate from the teeth 12 of the worm gear and then rotating the drive plate with respect to the gear. The relative movement between the drive plate may be as little as the width of one tooth or as much as 360 degrees. Typical small amounts of relative rotational movement are illustrated in FIGS. 4b and 4c as compared to FIG. 4a. This adjustment feature provides for a very precise adjustment of the park position without the need for replacement of parts. In operation, the sector gears 49 and 50 provide smooth and uniform motion of the arm and blade as it moves across the windshield.

The wiper mechanism in FIG. 3 is essentially identical in design to the one in FIG. 1, and corresponding parts thereof are given the same number designator with the addition thereto of a prime. However, in FIG. 3, the drive link 47 with sector gear is replaced by a connecting link 69, and sector gear 50 and holding links 53 and 54 are replaced by crank arm 70. A pivot pin 71 connection between crank arm 70 and link 69 is provided on crank arm 70 and link 69 is held in place by snap ring 72. For a given size of mechanism, the wiper in accordance with FIG. 1 is capable of providing a larger wipe angle of the arm and blade across the windshield than is a wiper in acordance with FIG. 3. This is accounted for by the interaction of sector gears 49 and 50 in that the angular movement of shaft 51 is the combined result of rotary motion between sector gears 49 and 50 and the reciprocating motion of the drive link 47. Also, in general, the wiping motion of the arm and blade provided by the mechanism in accordance with FIG. 1 is smoother and more uniform than that provided by a mechanism in accordance with FIG. 3. For applications where the wipe angle of the arm and blade is less than say 95 degrees, the connecting link arrangement in accordance with FIG. 3 is adequate. The drive plate 5', the plastic rotatable driving gear 23', park switch components and the park switch circuit in the mechanism of FIG. 3 are identical in design and function to that of FIG. 1. In FIG. 3, the fixed contacts 28', 29' and 30' along with their insulating support member 63' are shown positioned in the gear housing 40'.

Although in the embodiment shown the drive plate 5 is a circular piece having outwardly extending teeth at regular intervals so as to engage inwardly extending interfitting teeth on gear 23 which is the driving rotatable member, it will be appreciated by those skilled in the art that the drive plate need not be circular but, for example, could be a member of any shape extending across a diametrical portion of gear 23 and having teeth at the outer edges which engage teeth 12 on the gear. For certain applications, it may not be necessary to have teeth entirely around gear 23 if it is not contemplated that the parking angle should be relocatable anywhere within the sweep of the wiper arm.

It is possible also to have a completely different configuration in which the rotatably supported drive plate is separate from the driving rotatable member. For example, the drive plate might be a toothed member arranged to engage the outer teeth of gear 23. Nevertheless, repositioning of the drive plate relative to the gear would cause a change in the parking position of the wiper. The present invention contemplates all such variations.

Other variations in the embodiments of the system of the present invention within the scope of the claims will occur to those skilled in the art. All such variations and modifications within the scope of the claims are intended to be within the scope and spirit of the present invention.

I claim:
1. A windshield wiper mechanism comprising:
an electric motor having a housing supporting a field and rotatably supporting an armature with a shaft;
a drive frame supported on the motor housing;
a driving rotatable member rotatably supported on the drive frame coupled to and rotated by the motor shaft and having teeth at a common radius;
parking switch means on the rotatable member to stop the wiper at a predetermined position;
a rotatably supported drive plate having interfitting teeth that mesh with the teeth of the driving rotatable member readily removable and repositionable in a plurality of positions relative to the driving rotatable member so as to change the relative positioning of the two, said drive plate having at least one hole parallel to and located at a predetermined radial distance from the central axis about which the drive plate rotates as the motor shaft rotates;
a pin positionable in said at least one hole;
a drive link engaging said pin such that rotational movement can occur between the link and the drive plate;
a shaft parallel to the axis of drive plate rotation rotatably supported on the drive frame for driving a wiper arm and blade and fixed to lever means at one end, the other end of said lever means being coupled to said other end of the drive link so that reciprocating motion imparted to the end of the drive link causes the shaft to oscillate, thereby moving the wiper arm and blade back and forth through a predetermined angle in the course of a revolution of the drive plate, such that by disengagement of the drive plate from the driving rotatable member and reengagement in a new rotationally reoriented position and reassembly with the same connections the position in the wiper movement at which parking occurs may be changed without changing amplitude or wipe pattern of the blade.

2. The windshield wiper mechanism of claim 1 in which the coupling of the drive link and lever means is through meshing circular gear segments with pivotally connected link means interconnecting the gear segments and holding them in position relative to one another.

3. The windshield wiper mechanism of claim 1 in which the means coupling the drive link to the lever means and imparting rotation to the wiper shaft consists of pivot pin means.

4. The windshield wiper mechanism of claim 1 in which the rotatably supported drive plate is made coaxial and interfitting with the driving rotatable member means to cause the drive plate and the driving rotatable member to move as one piece and yet permit removal, rotation and reengagement of the drive plate relative to the rotatable member.

5. The windshield wiper mechanism of claim 4 in which the drive plate is circular with peripheral teeth that interfit with internal teeth on the driving rotatable member which member is a gear having outer teeth engagable with a worm axially supported on the shaft of the motor.

6. The windshield wiper mechanism of claim 1 in which a park switch is provided by first and second sliding contacts which connect the motor to a power source fixed to the drive frame and urged against a commutator fixed to and moving with the rotatable member, said commutator comprising conductor and insulator portions, such that the first contact leaves the conductor portion to open the switch and cause the wiper to park.

7. The windshield wiper mechanism of claim 6 in which the second contact never leaves the conductor and a third contact is provided which normally contacts insulation but during the interval when the switch enters the parking interval makes a connection with the second contact to provide a circuit through the motor for dynamic braking.

8. The windshield wiper mechanism of claims 6 or 7 in which a manual control switch is employed which in on position connects the power source to the motor through the first and second contact in series to enable stopping of the motor, and in another position of the manual control switch the motor is connected so as to cause continuous energization of the wiper motor.

9. The windshield wiper mechanism of claims 4 or 5 in which the drive plate is provided with a plurality of holes located at different radial distances from the central axis thereby providing the pin for the drive link with selective options for changing the wipe angle of the wiper.

* * * * *